United States Patent [19]

Snipes et al.

[11] Patent Number: 5,392,722
[45] Date of Patent: Feb. 28, 1995

[54] AIR SEPARATION TUBE FOR A PNEUMATIC DELIVERY SYSTEM

[75] Inventors: Terry L. Snipes, East Moline, Ill.; Jeffrey C. Schick, Davenport, Iowa; Everett T. Miller, Carbon Cliff, Ill.; Lawrence D. Green, Bettendorf, Iowa

[73] Assignee: Deere & Company, Moline, Ill.

[21] Appl. No.: 234,491

[22] Filed: Apr. 28, 1994

Related U.S. Application Data

[63] Continuation of Ser. No. 49,890, Apr. 20, 1993, abandoned.

[51] Int. Cl.[6] .................................................. A01C 7/20
[52] U.S. Cl. ..................................... 111/174; 111/176; 221/278; 222/630; 406/191
[58] Field of Search ............... 111/174, 175, 176, 900; 406/191, 192, 168, 171; 221/278; 222/630

[56] References Cited

U.S. PATENT DOCUMENTS

| | | | |
|---|---|---|---|
| 3,548,765 | 12/1970 | Grataloup | 111/174 |
| 3,804,036 | 4/1974 | Seifer, Jr. | 111/174 |
| 3,964,639 | 6/1976 | Norris et al. | 221/278 |
| 4,480,794 | 11/1984 | Fuss et al. | 239/654 |
| 4,493,273 | 1/1985 | Gauchet et al. | 111/176 |
| 4,646,941 | 3/1987 | Grosse-Scharmann | 111/174 |
| 4,693,264 | 9/1987 | Nedge | 131/296 |
| 4,697,604 | 10/1987 | Brown et al. | 131/296 |
| 5,156,102 | 10/1992 | Andersen | 111/175 |
| 5,161,473 | 11/1992 | Landphair et al. | 111/176 |

FOREIGN PATENT DOCUMENTS

| | | | |
|---|---|---|---|
| 434589 | 6/1970 | Australia . | |
| 904918 | 10/1986 | Belgium . | |
| 2256939 | 7/1973 | Germany . | |
| 0110055 | 6/1984 | Germany . | |
| 1508983 | 9/1989 | U.S.S.R. | 111/174 |

OTHER PUBLICATIONS

Brochure entitled "The Grain Damper Flow Control System for Easier Grain Handling", Baker Built Products, Inc., copyright 1991, 2 pages.
Brochure entitled "Kongskilde Cushionair Grain Vacs . . . true value for the farmer", No. 00600534, printed in Canada, May 1990, 9 pages.
Brochure entitled "The Sanders Seed-Vapor Bulk Seed Handling System", Sanders Seed-Vayor Company, 6 pages.

*Primary Examiner*—Eric K. Nicholson

[57] ABSTRACT

The present invention is an air separation tube for an agricultural planter. The air separation tube comprises a hollow tube having an inlet and outlet that is mounted to the side wall of a mini-hopper. The tube is provided with a downwardly curving bend having a screen through which air is allowed to pass. The screen prevents the seed carried by the air stream from leaving the tube. The outlet of the tube is located above the seed puddle of the seed meter which is coupled to the mini-hopper.

2 Claims, 3 Drawing Sheets

AIR SEPARATION TUBE FOR A PNEUMATIC DELIVERY SYSTEM

This application if a continuation of application Ser. No. 08/049,890, filed Apr. 20, 1993, now abandoned.

BACKGROUND OF THE INVENTION

1. Field of the Invention

The present invention is directed to an air separation tube for separating a plurality of solid objects, like seeds, from an air stream.

2. Description of the Prior Art

Pneumatic systems have been used to transport seeds in the agriculture industry. Large air seeders use pneumatic systems to deliver seeds to the furrow opener. The Case IH Cyclo Air Planters use positive air pressure to meter seeds and direct them to the furrow opener. It has also been proposed to add seed tube diffusers for bleeding off air from the seed tube on a Cyclo Air Planter, see U.S. Pat. No. 3,964,639.

In addition pneumatic systems have been used to transfer seeds from a main hopper to mini-hoppers, see U.S. Pat. No. 5,161,473. Cyclone separators have been used to separate seeds from the air stream of a planter, see U.S. Pat. No. 4,493,273.

In one proposed system a curved perforated plate is used to separate the seeds from the air stream. The perforated plate and cam wheels divide the metering chamber into a granulate compartment and an air compartment, see U.S. Pat. No. 5,156,102.

SUMMARY

It is an object of the present invention to reduce seed damage in supplying seed in a pneumatic system to a reservoir.

It is another object of the present invention to reduce the noise of supplying seed in a pneumatic system.

It is another object of the present invention that when the air separation tube is used in supplying a mini-hopper the seed tube immediately downstream of the screen acts as a reservoir for supplying seed to the mini-hopper on uneven terrain.

It is another object of the present invention that the air separation tube keeps the amount of seed in each reservoir the same over a broad range of air delivery rates.

The present invention is an air separation tube for removing seeds from an air stream. The air separation tube is particularly well suited for delivering seeds from a main hopper to individual mini-hoppers. A seed meter is coupled to each mini-hopper for metering seed dispensed therefrom. A seed tube is coupled to the seed meter for directing the metered seed from the seed meter to a planting furrow.

The air separation tube is very simple and comprises a hollow tube having an inlet and an outlet through which seeds are directed by an air stream. The tube is provided with a downwardly curving bend between the inlet and outlet. The outer curve of the downwardly curving bend is provided with a screen that is aligned with the air stream as the air stream passes into the tube. The screen is sized to prevent the passage of seeds.

The air separation tube downstream of the screen is provided with two additional bends which slow the flow of seed into the seed puddle. The seed collect in the tube downstream of the screen. The outlet of the tube being located directly above the seed puddle of the seed meter.

DETAILED DESCRIPTION

Figure 1:
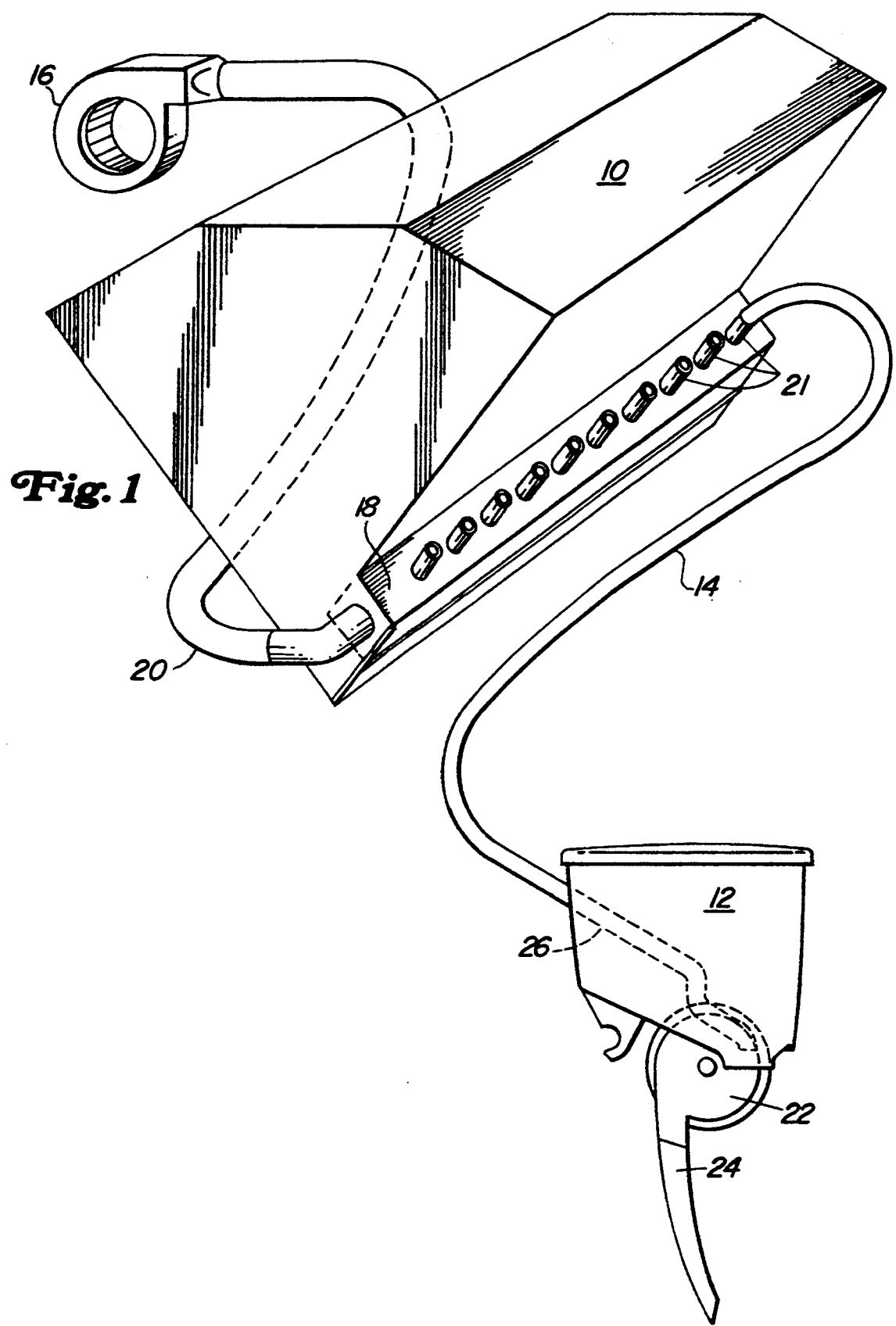
FIG. 1 is a schematic view of the seed delivery system for an agricultural planter.

FIG. 1 is a schematic view of an agricultural planter to which the present invention is particularly well suited. Seed is stored in a main hopper 10 and directed to mini-hoppers 12 through hose 14, only one shown. The operation of this planter is best discussed in U.S. Pat. No. 5,161,473, which is assigned to the assignee of the present application and which is incorporated herein by reference.

Constant pressure fan 16 supplies air to manifold 18 through air supply line 20. Seeds located in the main hopper are directed through manifold outlets 21 to hoses 14 by an air stream. The hose 14 directs the seeds to the mini-hoppers 12 by way of air separation tube 26. The mini-hopper directs seed to a seed meter 22 which directs the metered seeds through a seed tube 24 into a planting furrow.

Figure 2:
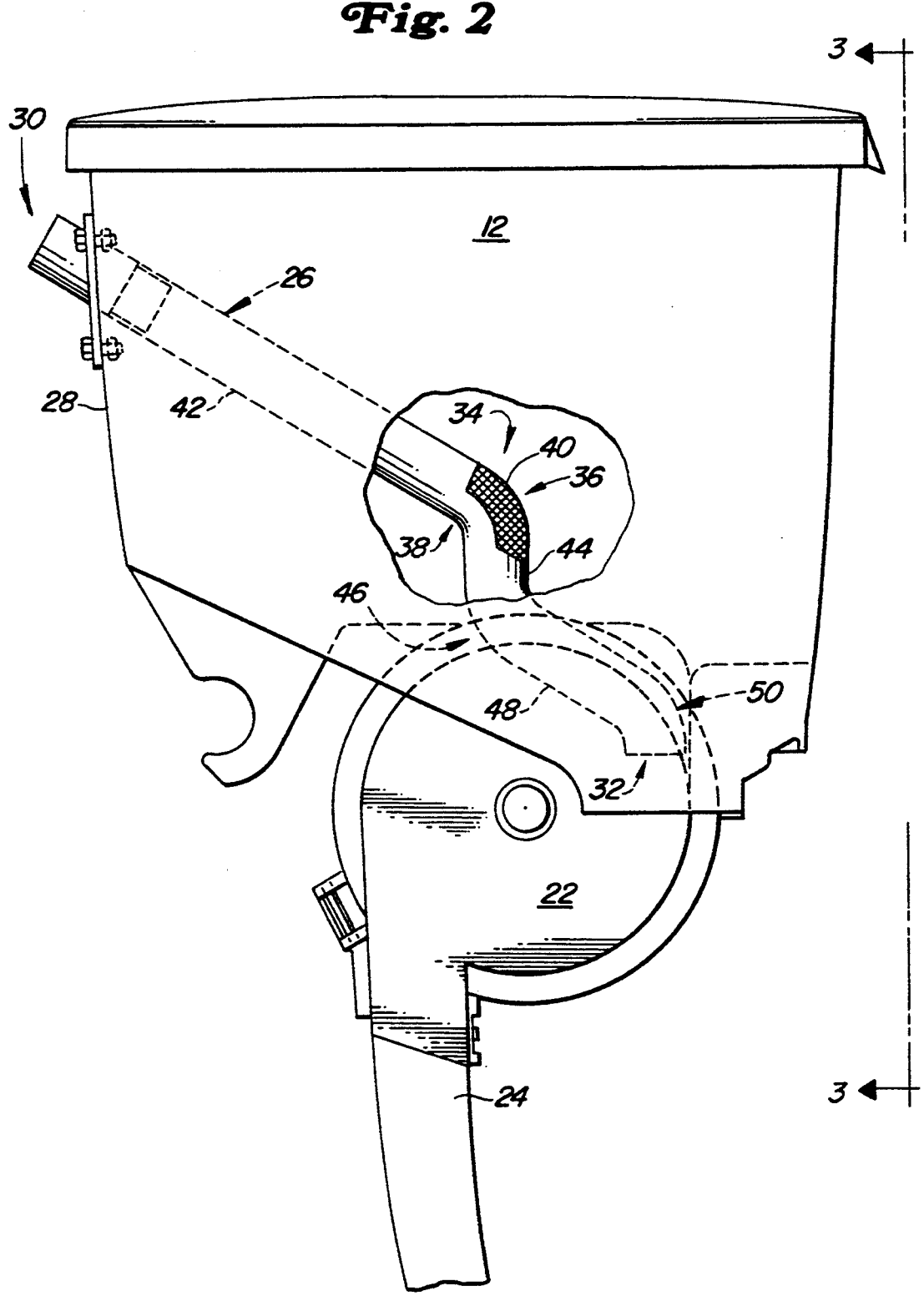
FIG. 2 is a partial cutaway side view of the air separation tube and mini-hopper.
Figure 3:
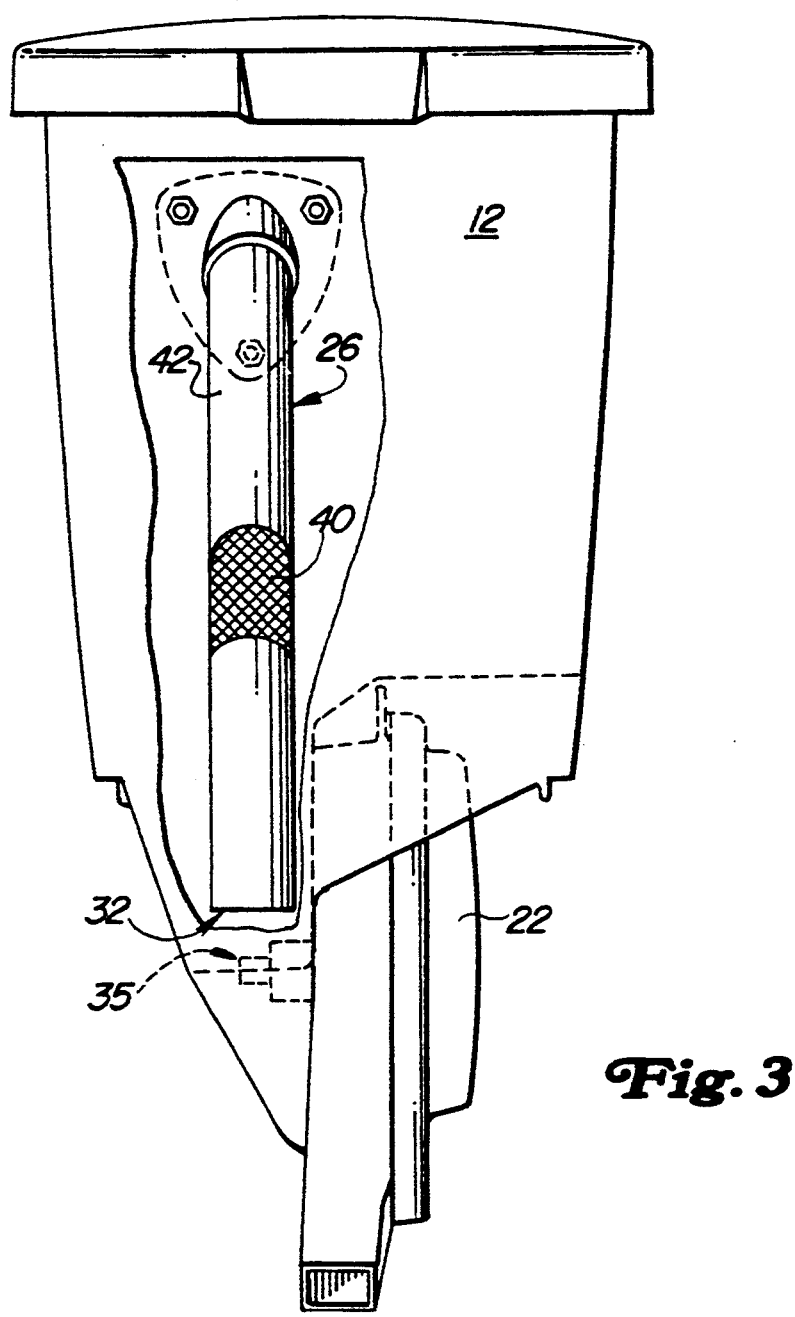
FIG. 3 is a partial cutaway rear view of the air separation tube and mini-hopper.

The air separation tube 26 of the present invention directs the seeds into the mini-hopper from hose 14. The air separation tube separates the seed from the air stream. As best illustrated in FIG. 2, the air separation tube comprises a hollow tube which is mounted to and extends through the mini-hopper wall 28. The tube is provided with an inlet 30 and an outlet 32. The inlet maybe provided with an easy coupler, not shown, for coupling the hose 14 to the inlet. The outlet is located directly above the seed puddle 35 of the seed meter.

The tube is provided with a downwardly curving bend 34 having an outside curve 36 and an inside curve 38. The outside curve is aligned with the air stream carrying seeds into the tube from hose 14. The outside curve is provided with a screen 40 through which the air stream passes. The screen is small enough to prevent seeds from exiting the tube.

The tube section 42 between the inlet and the downwardly curving bend 34 slopes downwardly so that the tube section 44 immediately downstream of the downwardly curving bend 34 is vertically aligned. Between the downwardly curving bend 34 and the outlet 32 is a downwardly sloping bend 46. The tube section 48 located between the downwardly sloping bend and the outlet is downwardly sloping. The outlet is provided with a downwardly curving bend 50 so that the outlet is vertically aligned with the seed puddle of the seed meter.

The hollow tube downstream of the screen may act as a seed reservoir to supply seed to the seed meter in uneven terrain. In positive pressure seed transfer systems, for example the one disclosed in U.S. Pat. No. 5,161,473, air warmer than ambient is pumped into the seed meter and hopper. This warmer air may eliminate condensation, thereby eliminating or reducing the need for talc with the seed meter. The air separation tube of the present invention further contributes to eliminating condensation in the seed meter by creating a very small seed puddle through which the warmer air may more easily flow. In addition by locating the screen on the outside curve 36 of downwardly curving bend 34 the screen is never completely blocked by seed which allows some warming air to get to the seed meter.

The invention should not be limited by the above-described embodiment, but should be limited solely by the claims that follow.

We claim:

1. An air separation tube for removing seeds from an air stream, the air separation tube comprising:

a hollow tube having an inlet and an outlet, the tube further having a downwardly curving bend located between the inlet and outlet, the downwardly curving bend having an inner curve and an outer curve, the hollow tube between the inlet and the downwardly curving bend slopes downwardly, the hollow tube is provided with a downwardly sloping bend between the downwardly curving bend and the outlet, the hollow tube extends vertically downwardly between the downwardly curving bend and the downwardly sloping bend, the hollow tube between the downwardly sloping bend and the outlet slopes downwardly, the outlet of the hollow tube is provided with a downwardly curving bend so that the outlet is vertically aligned; and a screen mounted on the outer curve of the downwardly curving bend in line with the air stream, whereby the air stream may flow through the screen out of the tube but the seeds are prevented from leaving the tube.

2. An agricultural planter comprising:

a main hopper for holding seeds to be planted;

a source of pressurized air pneumatically coupled to the main hopper;

at least one hose for carrying seeds from the main hopper by pressurized air;

at least one mini-hopper pneumatically coupled to the hose for receiving seeds from the main hopper;

an air separation tube pneumatically coupling the mini-hopper to the hose, the air separation tube having an inlet and an outlet, and a downwardly curving bend located between the inlet and outlet, the downwardly curving bend having an inner curve and an outer curve, a screen is mounted on the outer curve of the downwardly curving bend in line with the air stream, the air separation tube between the inlet and the downwardly curving bend slopes downwardly, the air separation tube is provided with a downwardly sloping bend between the downwardly curving bend and the outlet, wherein the air separation tube extends vertically downwardly between the downwardly curving bend and the downwardly sloping bend, the air separation tube between the downwardly sloping bend and the outlet slopes downwardly, the outlet of the air separation tube is provided with a downwardly curving bend so that the outlet is vertically aligned with the seed puddle of the seed meter, whereby the air stream may flow through the screen out of the tube but the seeds are prevented from leaving the tube;

a seed meter coupled to the mini-hopper having a seed puddle for receiving seed from the outlet of the air separation tube, the seed meter meters seed as it is dispensed from the mini-hopper; and a seed tube coupled to the seed meter for depositing seed passing through the seed meter into a furrow.

* * * * *